(12) United States Patent
Wirola et al.

(10) Patent No.: US 11,343,790 B2
(45) Date of Patent: May 24, 2022

(54) POSITIONING OF LOW POWER DEVICES

(71) Applicant: HERE Global B.V., Eindhoven (NL)

(72) Inventors: Lauri Wirola, Tampere (FI); Petri Rauhala, Tampere (FI)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 16/982,271

(22) PCT Filed: Mar. 20, 2018

(86) PCT No.: PCT/EP2018/056980
§ 371 (c)(1),
(2) Date: Sep. 18, 2020

(87) PCT Pub. No.: WO2019/179601
PCT Pub. Date: Sep. 26, 2019

(65) Prior Publication Data
US 2021/0022102 A1 Jan. 21, 2021

(51) Int. Cl.
*H04W 24/00* (2009.01)
*H04W 64/00* (2009.01)

(52) U.S. Cl.
CPC .................. *H04W 64/00* (2013.01)

(58) Field of Classification Search
CPC .................................................... H04W 64/00
USPC ......... 455/456.1, 453, 414.1, 418, 420, 518, 455/41.1, 456.3, 466, 411
See application file for complete search history.

(56) References Cited

U.S. PATENT DOCUMENTS

| | | | | |
|---|---|---|---|---|
| 5,533,021 A * | 7/1996 | Branstad | ................ | H04L 29/06 348/464 |
| 5,652,749 A * | 7/1997 | Davenport | ........ | H04N 21/2381 348/464 |
| 6,396,853 B1 * | 5/2002 | Humphrey | ............ | H04J 3/1682 370/395.42 |
| 6,865,188 B1 * | 3/2005 | Stirling | .................. | H04L 12/43 370/460 |
| 7,697,424 B2 * | 4/2010 | Bavant | ............... | H04Q 11/0478 370/230 |

(Continued)

FOREIGN PATENT DOCUMENTS

| WO | WO-2014/155151 A1 | 10/2014 |
|---|---|---|
| WO | WO-2015/010976 A1 | 1/2015 |

OTHER PUBLICATIONS

International Search Report and Written Opinion for Application No. PCT/EP2018/056980 dated Dec. 12, 2018, 14 pages.

(Continued)

*Primary Examiner* — Joseph Arevalo
(74) *Attorney, Agent, or Firm* — Alston & Bird LLP (57) ABSTRACT

The invention inter alia relates to a method, performed by a first apparatus, for positioning or assisting in positioning said first apparatus, said method comprising: obtaining multiple original identifiers identifying respective first radio networks or nodes thereof; generating, for each of at least two of said original identifiers, from a respective original identifier a shortened identifier being representative of said respective original identifier and having a smaller size than said respective original identifier; and providing said shortened identifiers over a second radio network for positioning or assisting in positioning said first apparatus.

19 Claims, 4 Drawing Sheets

(56) References Cited

U.S. PATENT DOCUMENTS

| | | | |
|---|---|---|---|
| 8,305,271 B2 | 11/2012 | Li et al. | |
| 2004/0258091 A1* | 12/2004 | Meyer | H04L 29/06 370/469 |
| 2006/0277346 A1* | 12/2006 | Doak | H04L 12/5692 710/305 |
| 2008/0037420 A1* | 2/2008 | Tang | H04L 1/1607 370/229 |
| 2008/0285496 A1* | 11/2008 | Fuchs | H04L 67/06 370/311 |
| 2014/0342755 A1* | 11/2014 | Youssef | H04W 64/003 455/456.2 |
| 2015/0067819 A1* | 3/2015 | Shribman | H04L 65/4084 726/12 |
| 2015/0208329 A1 | 7/2015 | Wirola et al. | |
| 2016/0338120 A1* | 11/2016 | Boyle | G06T 3/4092 |
| 2016/0345265 A1 | 11/2016 | Lee et al. | |
| 2017/0299724 A1 | 10/2017 | Hsu et al. | |

OTHER PUBLICATIONS

Lesconnec, N., IoT & Geolocation—LinkedIn [online] [retrieved from the Internet Dec. 12, 2017] <URL: https://www.linkedin.com/pulse/iot-geolocation-nicolas-lesconnec/>. (Apr. 6, 2017), 9 pages.

SigFox—Wikipedia [online] [retrieved from the Internet Oct. 2, 2020] <URL: https://web.archive.org/web/20171021201029/https://en.wikipedia.org/wiki/Sigfox>. (Oct. 21, 2019) 2 pages.

\* cited by examiner

POSITIONING OF LOW POWER DEVICES

CROSS-REFERENCE TO RELATED APPLICATIONS

This application is a national phase entry of International Application No. PCT/EP2018/056980, filed Mar. 20, 2018, the entire contents of which are incorporated herein by reference.

FIELD OF THE DISCLOSURE

The invention relates to the field of positioning, in particular the positioning of low power devices.

BACKGROUND

The number of devices with location capabilities is expected to grow exponentially in the next decade or so. This growth is the result of the Internet-of-Things (IoT) era, in which more and more devices get connected to the Internet. Soon homes, factories, cities and transportation means will be equipped with low-cost sensors that produce real-time information on various characteristics and environment variables. Moreover, cheaper electronics enables factories and industries to equip assets and supply chains with trackers that provide real-time information on the flow of goods.

A basic requirement for the IoT is that the sensors and trackers usually need to be location-aware.

The location-awareness can basically be achieved in two ways: either the device has its own positioning capabilities (e.g. by locally utilizing signals from a global navigation satellite system or other radio systems such as a cellular, WLAN or Bluetooth system) or the device makes measurements of the radio environment of such radio systems (e.g. a cellular, WLAN or Bluetooth system) and sends them to a server, e.g. a cloud server, for position determination.

When it comes to small devices that must function autonomously for extended periods of time, power consumption is of special concern. The devices are powered by batteries and, thus, any means to reduce the power drain are welcome. As far as location technologies are concerned, there are few ways to reduce power consumption. The greatest power saving results from using the correct technology at the correct time.

One specific characteristic of the IoT devices is their low bandwidth. IoT devices need to be extremely power-efficient so that their battery lasts for extended periods. One of the mechanisms to reduce power consumption is to use low-bandwidth connectivity networks that have especially been designed for IoT devices. In practice, low-bandwidth means small payload size per message combined with a small number of messages per day.

As described above, one way of equipping such IoT devices with a positioning capability is to observe for instance certain characteristics of WLAN signals and provide these to a server, which then uses these observed characteristics to locate the device using a WLAN positioning service. Due to the described low bandwidth, however, only very limited information about the observed WLAN signals can be provided from the IoT devices to the server. This will result in poor positioning results, e.g. poor speed, reliability and/or accuracy.

Therefore, it is inter alia an object of the invention to improve the positioning performance for devices in low bandwidth scenarios, such as low power devices, so that a more accurate and reliable positioning of these devices can be achieved.

SUMMARY OF SOME EXAMPLE EMBODIMENTS OF THE INVENTION

According to a first aspect, a (first) method, performed by a first apparatus, for positioning or assisting in positioning said first apparatus, is described, said method comprising:
  obtaining multiple original identifiers identifying respective first radio networks or nodes thereof;
  generating, for each of at least two of said original identifiers, from a respective original identifier a shortened identifier being representative of said respective original identifier and having a smaller size than said respective original identifier;
  checking whether a-priori information on a location of said first apparatus is available or is potentially available,
  providing said shortened identifiers over a second radio network for positioning or assisting in positioning said first apparatus; and
  providing at least one original identifier together with said shortened identifiers, if a result of said checking is that a-priori information on a location of said first apparatus is not available or potentially not available.

According to a second aspect, a (second) method for positioning or assisting in positioning a first apparatus, performed by a second apparatus, is described, said method comprising:
  obtaining at least two shortened identifiers over a second radio network for positioning of said first apparatus, each of said shortened identifiers having been generated from a respective original identifier obtained at said first apparatus and identifying respective first radio networks or nodes thereof, wherein a respective shortened identifier is representative of a respective original identifier and having a smaller size than said respective original identifier; and
  determining a position estimate of said first apparatus at least in part based on positioning data of respective first networks or nodes thereof associated with said at least two shortened identifiers, wherein, if available, said determining of a position estimate of said first apparatus is at least in part also based on a-priori knowledge on a position of said first apparatus.

According to the first or second aspect, a (first or second) apparatus is described configured to realize or comprising respective means for realizing the method according to the first or second aspect. The means of these apparatuses can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

According to the first or second aspect, an alternative (first or second) apparatus is also described comprising at least one processor and at least one memory including computer program code, the at least one memory and the computer program code configured to, with the at least one processor, cause an apparatus at least to perform the method according to the first or second aspect.

Any of the described apparatuses may comprise only the indicated components or one or more additional components. Any of the described apparatuses may be a module or a component for a device, for example a chip. Alternatively, any of the described apparatuses may be a device, for instance a server or a mobile terminal. Any of the described apparatuses may for instance at least comprise a user interface, a communication interface and/or an antenna.

According to the first or second aspect, a computer readable storage medium is also described in which computer program code according to the first or second aspect is stored.

According to the first or second aspect, a computer program code is further described, the computer program code when executed by a processor causing an apparatus to perform the actions of the method of the first or second aspect. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc. It is to be understood that also the computer program code by itself has to be considered an embodiment of the invention.

According to a third aspect, a system is described comprising a first apparatus and a second apparatus, said first apparatus configured to realize or comprising respective means for realizing a method according the first aspect and said second apparatus configured to realize or comprising respective means for realizing a method according to the second aspect.

According to the third aspect, an alternative system is also described comprising a first apparatus and a second apparatus, each apparatus comprising at least one processor and at least one memory including computer program code, the respective at least one memory and the respective computer program code configured to, with the respective at least one processor, cause the first apparatuses to perform a method according to the first aspect and cause the second apparatus to perform a method according to the second aspect.

For instance, the first radio network may be a cellular or non-cellular radio network (e.g. a communication system). A cellular radio network is for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE, system, the LTE Advanced (LTE-A) system or the IEEE 802.16m WiMAX system) or fifth generation (5G) radio network. A non-cellular radio network is for instance a WLAN network, a Bluetooth (LE) network, a ZigBee network, a radio-frequency identification (RFID) network, a broadcasting network such as for instance Digital Video Broadcasting (DVB), Digital Audio Broadcasting (DAB) or Frequency-Modulated (FM)/Amplitude-Modulated (AM) radio, a Near Field Communication (NFC) network, etc. A cellular radio network may for instance be characterized by a basically seamless pavement of a geographical area (usually in the order of at least hundreds or thousands of square kilometers) with cells in which coverage is provided by respective nodes of the radio network that are operated by the same operator, which network may for instance support communication handover between cells.

Consequently, a non-cellular radio network may be characterized as a radio network that does not have all of these properties. It is also possible that the first radio network is a Low Power Wide Area Network (LPWAN), e.g. based on LoRa, NarrowBand IoT or Sigfox technology, just to name some examples, which will be explained in more detail with reference to the second radio network.

Accordingly, a node of such a first radio network may be a node or cell of the above cellular or a node of the above non-cellular radio networks, such as an access point, for example a WLAN AP, for instance according to one or more of the IEEE 802.11 family of standards. A WLAN may for example operate on a single frequency band (2.4 GHz according to IEEE 802.11b/g or 5.0 GHz according to IEEE 802.11a/h/ac, representing the two frequency bands 2.4-2.4835 GHz, and 5.15-5.725 GHz, respectively), or on two frequencies bands (2.4 GHz and 5.0 GHz according to IEEE 802.11n, again representing the two frequency bands 2.4-2.4835 GHz, and 5.15-5.725 GHz, respectively).

Accordingly, non-limiting examples of an obtained original identifier identifying a respective first radio network or a node thereof are cellular cell identifiers (e.g. a Mobile Country Code (MCC), a Mobile Network Code (MNC), a Local Area Code (LAC) and/or a Cell Identity (OD) in case of coverage areas of a 2G mobile communications system, a UTRAN Cell ID (UC-ID) in case of a 3G mobile communications system, or an LTE Cell Identity in case of a 4G communications system), and identifiers of WLAN access points (e.g. a BSSID, a Medium Access Control (MAC) address, or an SSID of a WLAN access point). An original identifier may be understood to be associated with the respective first radio network or the node thereof. An original identifier may be a globally or locally unique identifier. An original identifier can be obtained (received) over the respective first radio network, e.g. in contrast to the shortened identifier (which will be described in more detail below). The identifier may for instance be associated with layer 2 of the OSI model.

The shortened identifier is shortened compared to the original identifier it is generated from. For instance, the shortened identifier has a shorter length than the respective original identifier. The shortened identifier is for instance generated by applying a mathematical operation on the original identifier, by mapping the identifier onto the shortened identifier and/or by using a hash function, as will be explained in further detail below. In contrast to the original identifier, the shortened identifier may not be globally or locally unique. The shortened identifier, for instance, may unambiguously be generated from the respective original identifier, but e.g. not vice versa, i.e. the shortened derivative does not necessarily allow for deducing the respective original identifier.

That the shortened identifier is smaller in size than the original identifier means that the shortened identifier for instance has less information units, needs less memory when stored and/or less bandwidth when transmitted compared to the original identifier. A shortened identifier therefore leads to reduced consumption of transmission bandwidth, transmission costs and/or resources, such as energy, when the shortened identifier instead of the original identifier is transferred, for example. The shortened identifier may be generated by reducing its length compared to the respective original identifier. For example, the original identifier may be a certain byte number (e.g. a 12-byte number), while the shortened identifier may be a number having less bytes (e.g. a 1-byte, 2-byte, 3-byte or 4-byte number). For instance, if not more than 6 bytes shall be used by the shortened identifiers combined, it may be possible to generate six 1-byte, three 2-byte, two 3-byte or four 1.5-byte identifiers. It may also be the case that shortened identifiers of different sizes are generated. In the above example, if not more than 6 bytes shall be used by the shortened identifiers combined, it may for instance be the case that one 2-byte and four 1-byte identifiers (or any other suitable combination) are generated.

As an example (at least or at most) one, two, three, four, five or six original identifiers may be used for generating the respective shortened identifiers. This may also depend on the number of original identifiers observable or obtainable by the first apparatus.

In one example, the first apparatus provides exclusively shortened (and optionally original) identifiers for positioning purposes. Alternatively, it may be possible that the first apparatus also provides additional information (e.g. a received signal strength) about the first networks or nodes thereof to the second apparatus.

The shortened (and optionally original) identifiers may be provided to a second apparatus according to the second aspect. There, the at least two shortened identifiers may be obtained (at least in part) over the second radio network.

The second radio network is understood to be a network different from the first radio networks. The second radio network may have a larger coverage area than a first radio network. The second radio network may provide a lower bandwidth (rate of data transfer, e.g. bits/s and/or messages/day) than a first radio network. The second radio network may in particular be a low power wide area network (LP-WAN), as will be explained in more detail below.

At least in part based on positioning data of respective first networks or nodes thereof associated with said at least two shortened identifiers, the second apparatus can determine a position estimate of said first apparatus. Positing data of a first network or a node thereof may for instance comprise information about the geographical position of the node of the radio network, such as coordinates of the node of the radio network. Positioning data may additionally or alternatively comprise coverage area model information and/or radio channel model information of the respective node. A determination of a position of the first apparatus may for example be achieved by an averaging process, e.g. by averaging the respective geographical positions of the respective nodes for which a shortened identifier has been obtained. However, other positioning algorithms may also be utilized. This may depend on the information available about the first apparatus and/or the data received from the first apparatus. For instance, if also signal strength data is received from the first device, more complex positioning algorithms, e.g. involving coverage area models or the like, may be used.

The positioning data may be obtained from a database, e.g. a database of the second apparatus or a database from which the second apparatus can retrieve data. The database may store a plurality of original and/or shortened identifiers of respective first radio networks or nodes thereof, as explained for example of a non-cellular radio network such as WLAN systems. The database may associate the positioning data of respective first networks or nodes thereof with the original identifiers and/or the shortened identifiers. For instance, the database comprises datasets storing an original identifier and respective positioning data. A dataset may also comprise a respective shortened identifier.

However, in particular in case the shortened identifier is a truncated original identifier, the database or datasets do not necessarily need to comprise respective shortened identifiers, as the shortened identifiers can easily be derived from the stored original identifiers.

In order to obtain original identifiers, the first apparatus may comprise a radio interface, e.g. a receiver or transceiver for receiving the original identifiers of the first radio networks. It may be the case that the radio interface or module is a stripped down radio interface or module, which may for instance be unable to communicate over the respective first radio network. The radio interface or module may for instance work as a radio network packet analyzer or sniffer, which may be able to receive in particular the respective original identifiers of the first radio network. In other words, the radio interface or module is only meant for receiving respective signals for positioning purposes, but not for providing connectivity (which connectivity would be expensive in terms of energy).

As an example, the bandwidth of the first apparatus may be restricted to at most 140 messages per day, each with the payload size of 12 bytes only. If the first apparatus needs to be located e.g. every 10 minutes, this will take approximately 140 messages per day. This in turn means that the information provided by the first apparatus for positioning purposes, e.g. with a positioning request of the first apparatus, can strictly only comprise 12 bytes or less. In case of the original identifier being a WLAN MAC address, the identifier is 6 bytes and, thus, the first apparatus would normally only be able to send a message carrying only two WLAN MAC addresses. However, by using shortened identifiers, it may for instance be possible to provide one original identifier (one full mac address) and two, three, four or even six shortened identifiers. This may improve the positioning result when positioning the first device.

Preferably, the positioning estimate of the first apparatus may by further used by the second apparatus, e.g. stored in a local or cloud database, and used e.g. for analytic and/or visualization purposes. However, it is generally also possible that the determined position estimate is provided from the second apparatus to the first apparatus, so that the first apparatus is aware of its own position.

While according to the first method at least one original identifier together with said shortened identifiers is provided (at least in certain cases), accordingly, the second method may further comprise:

obtaining at least one original identifier obtained at said first apparatus together with said shortened identifiers;
wherein said determining of a position estimate of said first apparatus is at least in part also based on positioning data of respective first networks or nodes thereof associated with said at least one original identifier.

Preferably, precisely one original identifier is provided (in each case). Therein, the original identifier, which is provided by the first apparatus and obtained by the second apparatus, respectively, is different from the original identifiers used for generating the shortened identifiers. It can thus be understood that an additional original identifier is provided and obtained, which has not been used for generating a shortened identifier. This may further increase the positioning performance, in particular if no information on the position of the first apparatus is yet known, as further described below.

For instance, the obtained original identifier and its property to be globally or locally unique may be used for a first (coarse) position estimate or identification of an area in which the first apparatus may be positioned. Searching for the original identifiers or the respective first networks or nodes thereof matching the obtained shortened identifiers can thus be limited to those original identifiers being associated with positioning data of a geographical position close to this first position estimate or area.

In this regard, the first method may further comprise:
providing said shortened identifiers without providing an original identifier, if a result of said checking is that a-priori information on a location of said first apparatus is available or potentially available.

In case a-priori information on a location of the first apparatus is (potentially) already available (e.g. at the second apparatus or another apparatus in communication with the second apparatus), it may not be necessary to provide an original identifier (the transmission of which consumes more bandwidth than the shortened identifiers) to the second apparatus. Rather, only shortened identifiers may be provided by the first apparatus and obtained by the second apparatus.

However, if a-priori information on a location of the first apparatus is (potentially) not available, it may be advantageous to provide at least one (e.g. precisely one) original identifier for positioning purposes. The at least one original identifier obtained by the second apparatus can be used to reliably and without ambiguities query a database for positioning data. Ambiguities resulting from the shortened identifiers may be resolved in this way.

A-priori information on a location of the first apparatus may comprise an earlier position estimate, e.g. from an earlier positioning process. It may also be possible that the area in which the first apparatus may be positioned is limited, so that only a limited geographical area may be relevant in the first place. The a-priori information may be present at the first and/or second apparatus. Since the first apparatus may not necessarily know, e.g. whether the second apparatus is in possession of a-priori information or whether the first apparatus has moved substantially, the first apparatus may only check whether the a-priori information is potentially available. For instance, it may be assumed that a-priori information on the location is available if an earlier determination of a position estimate was performed (e.g. within a certain maximum time limit, e.g. within the last hour or day) and/or if the first apparatus can determine it has not moved substantially (e.g. within a certain maximum distance, e.g. by utilizing movement sensor data of the first device).

According to an exemplary embodiment of the different aspects, said method is performed more than once and, for at least some provisions (e.g. for each provision) of the at least one original identifier, a different original identifier (than the one used before) is chosen from the obtained multiple original identifiers. As the described method may be carried out repeatedly (in particularly regularly and/or automatically), the action of providing said shortened identifiers and providing said at least one original identifier together with said shortened identifiers may be carried out more than once, e.g. multiple times. In order to increase the likelihood of a successful positioning and/or to increase the quality (e.g. precision) of the positioning, the original identifier chosen from the obtained/available original identifiers may be changed from time to time, e.g. for every provision (i.e. from message to message). For instance, it may be cycled through the obtained/available original identifiers. This is in particularly advantageous in case the first device is stationary or only moving slightly. This advantage can be illustrated by considering the scenario, in which the first apparatus is stationary or only moving slightly and there is no (or not sufficient) a-priori information on a location of the first apparatus available (e.g. at the second apparatus). If the first apparatus now always provides the same original identifier, it may be the case that the provided original identifier is unknown at the second apparatus or no (sufficient) positioning information is available for the original identifier. In that case, a positioning (or a sufficiently precise positioning) of the first identifier may not be achievable.

According to an exemplary embodiment, positioning data of respective first networks or nodes thereof associated with said at least two shortened identifiers is identified by only considering positioning data of first networks or nodes thereof within a certain geographical proximity of said first network or node thereof associated with said at least one original identifier.

For instance, the geographical proximity may be a maximum distance, such as 1km, 500 m, 100 m, 50 m, so that only positioning data of first network or node thereof is considered within said maximum distance from said first networks or nodes thereof associated with said at least one original identifier. For this, the database comprising respective positioning data may be designed to be searchable by location. For instance, original identifiers (and respective position data) associated with networks or nodes thereof, which are within said certain geographical proximity, may be retrieved from the database. The shortened identifiers can then be matched to the respective original identifiers retrieved from the database. In this way, a potential ambiguity of the shortened identifiers may be resolved.

It may nevertheless be the case that the use of shortened identifiers leads to ambiguities. Therefore, and according to an exemplary embodiment, in case it is determined that an obtained shortened identifier is associated with positioning data of different first networks or nodes thereof, the positioning data of none, all or a preferred one of said different first networks or nodes thereof is used for said determining of a position estimate. This may be the case for one or more single shortened identifiers. As an example, a preferred one of said different first networks or nodes thereof may be the first network or node thereof with the highest received signal strength.

According to an exemplary embodiment of the different aspects, said at least two original identifiers for which a shortened identifier is generated and provided and/or said at least one original identifier to be provided with said shortened identifiers are/is selected from said multiple original identifiers at least in part based on a quality parameter of signals of respective first radio networks or nodes thereof.

It may be the case that the first apparatus is able to obtain more original identifiers than (original and shortened) identifiers are supposed to be provided over the second network. In that case the first apparatus needs to select the (original) identifiers to be used. It is preferred that (at least a part of) the original identifiers are selected at least in part based on a quality parameter of signals of respective first radio networks or nodes thereof. An example of a quality parameter is a received signal strength indication (RSSI) value. Preferably the original identifiers with the highest signal strength are selected, since the respective radio networks or nodes thereof usually are most proximate to the first apparatus.

According to an exemplary embodiment of the different aspects, said at least two original identifiers for which a shortened identifier is generated and provided and/or said at least one original identifier to be provided with said shortened identifiers are/is selected from said multiple original identifiers at least in part based on a commonality of said original identifiers.

Preferably, said commonality of said original identifiers is an identical section of one or more information units of respective original identifiers. An information unit may for instance be a bit, a byte or an octet. Preferably, the commonality is the first n (with n being an integer) information units, e.g. the first three bytes of respective original identifiers. In the case of MAC addresses, for instance, the first three bytes identify the organization that issued the identifier and are known as the Organizationally Unique Identifier (OUI).

According to an exemplary embodiment of the different aspects, said generating of a respective shortened identifier is at least based on truncating a respective original identifier.

Accordingly, said shortened identifiers obtained at the second apparatus may in each case be based on a respective truncated original identifier.

For instance, certain, e.g. first, last or middle, (consecutive) information units or a certain section of the original identifier may be used in order to generate the shortened identifier. As an example, the last one, two, three four byte(s) of an original identifier may be used as the shortened identifier. It may be possible to further process the respective information units of the original identifier (e.g. by algorithms) or to use the information units as is.

According to an exemplary embodiment of the different aspects, said generating of a respective shortened identifier is at least based on utilizing one or more information units of a respective original identifier.

Accordingly, said shortened identifiers obtained at the second apparatus are in each case at least based on one or more information units of a respective original identifier.

The used information units may be consecutive or isolated information units of the original identifier. For instance, the shortened identifier may be comprised of certain first and last information units of the original identifier. As explained above, the shortened identifier may thus be comprised of information units of the original identifier. In case the identifier is a MAC address for instance, the identifier may be a 6-byte number with the upper three bytes being the IEEE-granted Organization Unique Identifier (OM) and the lower three bytes being the OUI-specific part. A selection of one or more information units or parts of the original identifier may comprise selecting a byte of the OUT (for instance, the lowest or highest) and a byte of the OUI specific part (for instance, the lowest or highest).

According to an exemplary embodiment of the different aspects said generating of a respective shortened identifier is at least based on hashing a respective original identifier or a part thereof.

Accordingly, said shortened identifiers obtained at the second apparatus may in each case at least be based on a hash value of a respective original identifier or a part thereof.

The hash function used for hashing may for instance be a cyclic redundancy check (CRC) or a checksum. For instance, in cyclic redundancy check algorithms a shortened check value of an input value is obtained, which is or is based on the remainder of a polynomial division. For instance, a cyclic redundancy check algorithm allowed by the sector of the International Telecommunication Union ITU-T may be used, for instance the CRC-16 ITU-T algorithm. Examples of crc or checksum algorithms are BSD checksum, Checksum, CRC-16, CRC-32, CRC-64 or SYSV checksum, sum, sum8, sum16, sum24, sum32. Generally, also other non-cryptographic or cryptographic hash functions may be used. If the original identifier is used as the input value, the obtained shortened check value may then be used for generating the shortened identifier of the original identifier. For instance, the shortened identifier may be the shortened check value.

For instance, if the identifier is an n-byte number, the shortened derivative may be an m-byte number (with 0<m<n). For instance, as a non-limiting example, the identifier may be 6 bytes long. After using an CRC algorithm the identifier is mapped to a corresponding hash value.

According to an embodiment of the different aspects, said second radio network is a Low Power Wide Area Network. Accordingly, said first apparatus may be a or may comprises a low power device of said Low Power Wide Area Network.

A Low Power Wide Area Network (LPWAN) is in particular understood to be a wireless telecommunication wide area network designed to allow long range communications (e.g. over hundreds of meters or over kilometers) at a low bit rate among things (connected objects). Accordingly, a low power device may be a device of such a network, e.g. a sensor operated on battery. The frequencies employed may in particular be in the MHz regime (e.g. 868 MHz or 902 MHz).

The Low Power Wide Area Network may for instance be based on LoRa technology (e.g. LoRaWAN), which is a chirp spread spectrum (CSS) radio modulation technology. Alternatively, the Low Power Wide Area Network may be based on Ultra Narrow Band (UNB) modulation technology.

One non-limiting example of a Low Power Wide Area Network is a Sigfox network. The frequencies used are 868 MHz and 902 MHz. Such communication supports up to 140 uplink messages a day (from first to second apparatus), each of which can carry a payload of 12 Bytes (excluding message header and transmission information) and up to 4 downlink messages per day (from second to first apparatus), each of which can carry a payload of 8 Bytes.

Another non-limiting example of a Low Power Wide Area Network is a NarrowBand IoT (NB-IoT) network, standardized by the 3rd Generation Partnership Project (3GPP). The NB-IoT technology may be deployed in-band in spectrum allocated to Long Term Evolution (LTE), using resource blocks within a normal LTE carrier (or in the unused resource blocks within a LTE carrier's guard-band) or stand-alone for deployments in dedicated spectrum.

According to an example embodiment of the different aspects, a data rate of at said first apparatus for providing said shortened identifiers and/or said at least one original identifier is 50 kbit/s or less, preferably 10 kbit/s or less, further preferably 1 kbit/s or less.

Accordingly, a data rate for obtaining said shortened identifiers and/or said at least one original identifier may be 50 kbit/s or less, preferably 10 kbit/s or less, further preferably 1 kbit/s or less.

The data rate may for instance be a maximum data rate. The described data rates may not only be the data rates for providing or obtaining the respective identifiers, but also the generally used data rates for the second radio network.

According to an example embodiment of the different aspects, a payload of a message and/or a packet of said first apparatus for providing said shortened identifiers and/or said at least one original identifier is at most 100 bytes, preferably at most 50 bytes, further preferably at most 12 bytes.

Accordingly, a payload of a message and/or a packet for obtaining said shortened identifiers and/or said at least one original identifier may be at most 100 bytes, preferably at most 50 bytes, further preferably at most 12 bytes.

For instance, a message may be comprised of multiple or only a single packet. Apart from a data limit for a message or packet, there may also be a message or packet limit per day. For instance, the first apparatus may not be allowed to send more than n messages per day, with n being 200 or less, preferably 150 or less (e.g. 140). For instance, the first apparatus may not receive more than n messages per day, with n being 10 or less preferably 5 or less (e.g. 4).

According to an exemplary embodiment of the different aspects, said shortened identifiers and/or said at least one original identifier are provided in a payload of a single message and/or a single packet.

Accordingly, said shortened identifiers and/or said at least one original identifier may be obtained in a payload of a single message and/or a single packet.

As already described, according to an exemplary embodiment of the different aspects, said first radio networks comprise at least one of
a Wireless Local Area Network (WLAN) system;
a Bluetooth (BT) system;
a Radio Frequency Identification (RFID) system;
a cellular network system.

For instance, each of the first networks is a WLAN network, a Bluetooth system, an RFID system or a cellular network system. However, it may also be the case that the first networks comprise different kinds of networks.

According to an exemplary embodiment, said second apparatus is or comprises a server or a part thereof. The server may in particular comprise or have access to a database comprising original identifiers and associated positioning data. The server may be a server remote from the first apparatus. The server may be realized by one or more computers or a computer cloud.

The features and example embodiments of the invention described above may equally pertain to the different aspects of the invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1:
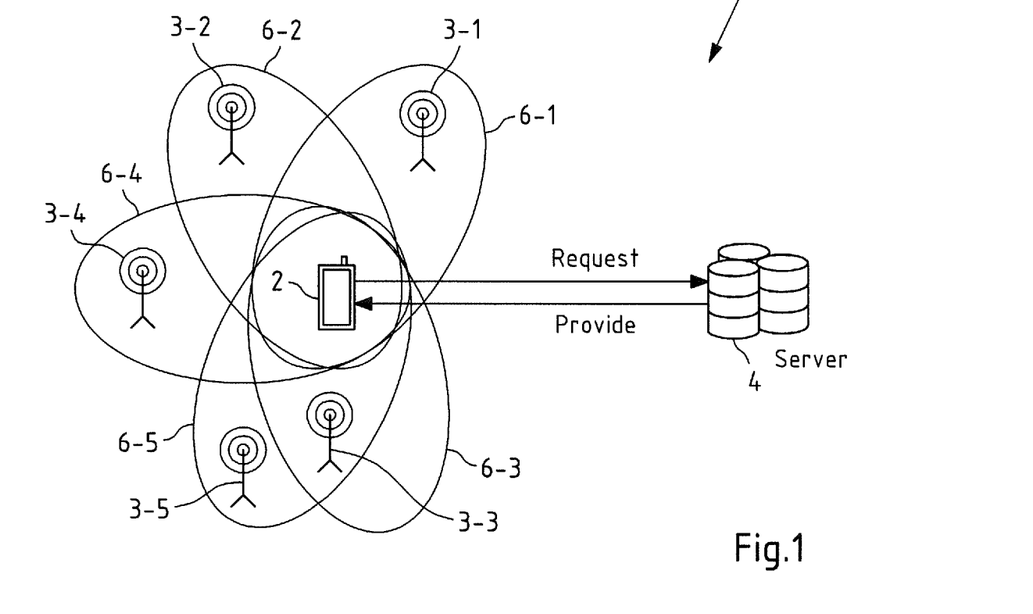
FIG. 1 is a schematic illustration of a positioning system in which example embodiments of apparatuses according to the present invention are provided.

FIG. 1 shows a system 1, in which example embodiments of apparatuses according to the present invention are provided. The system 1 is therefore an example embodiment of the third aspect of the invention. In FIG. 1, a first apparatus 2, which is in this case a low power device of a LPWAN, is capable of obtaining original identifiers associated with nodes 3-1, 3-2, 3-3, 3-4, 3-5 of first radio networks. The nodes may belong to the same or different networks. Each of nodes 3-1, 3-2, 3-3, 3-4 and 3-5 provides certain radio coverage in a respective coverage area 6-1, 6-2, 6-3, 6-4 and 6-5. As already described, non-limiting examples of a node of a radio network may be an access point or beacon of a non-cellular radio network, such as for instance a WLAN network, or a base station (or sectors thereof) of a cellular radio network, such as for instance a 2G, 3G or 4G radio network.

Obtaining an original identifier associated with a node of a first radio network by the first apparatus 2 may for instance require that the first apparatus is able to observe, e.g. to receive and correctly decode an original identifier of the node of the first radio network that provides the coverage area, for instance a basic service set identification (BSSID), a Medium Access Control (MAC) address, a service set identifier (SSID) or another identifier. For this, it may be required that the first apparatus is able to receive one or more signals (e.g. a broadcast channel) of the node of the first radio network, which are for example sent by the node with a pre-defined minimum quality (for instance defined in terms of a signal-to-noise ratio or a signal-to-noise and interference ratio), and/or is able to at least partially receive and correctly decode one or more signals of the node. Some or all of these conditions for obtaining an original identifier associated with a node of a first radio network may for instance be met when the first apparatus is within the coverage area of the node of the first radio network.

A node of a first radio network may for instance have an original identifier that is unique (e.g. globally unique) at least in the radio network (and for instance also in all other radio networks). Equally well, a node of a radio network may for instance have an original identifier that is not globally unique (e.g. only locally unique) in the radio network, but that is at least unique in a certain region covered by the radio network.

Obtaining an original identifier (or information in general) from the node of the first radio network may for instance require that the first apparatus is technically capable to receive such an identifier or such information. Thus, the first apparatus may have to support the transmission technology (e.g. the communication standard) used by the node. However, receiving such signals or information from the node may not necessarily require that the first device is also entitled to communicate with the node.

The first apparatus 2 can send messages to a second apparatus 4 (a remote server) at least in part over a second radio network, which is a LPWAN network. Thus, the first apparatus 2 could generally provide the obtained original identifiers to the second apparatus 4. However, due to the limited bandwidth of the second radio network, this would take up too much bandwidth and/or require a too long time.

Thus, the first apparatus 2 is capable of generating shortened identifiers from some or all of the obtained original identifiers and to inter alia provide these shortened identifiers to the second apparatus 4 and receive a position estimate as a response, as illustrated in FIG. 1, but which will be described in more detail below.

Now, shortened (and optionally original) identifiers may be provided to the second apparatus 4 in the scope of a position request of the first apparatus 2 (requesting a determination of its position). Based on the shortened (and optionally original) identifiers obtained by the first apparatus 2 and received by the second apparatus 4 (and e.g. optionally also based on models of the coverage areas and/or radio channel models of the nodes 3-1, 3-2, 3-3, 3-4 and 3-5) a position estimate of the first apparatus 2 can be determined. Therein, the determination of the position may be derived from an average of the position of the nodes 3-1, 3-2, 3-3, 3-4, 3-5 the intersection of the coverage areas 6-1, 6-2, 6-3, 6-4 and 6-5, or by triangulation, to name but a few non-limiting examples. The position estimate may be provided to the first apparatus 2 as an answer to the position request.

For the purpose of positioning, positioning data on the nodes 3-1, 3-2, 3-3', 3-4, 3-5 and/or coverage areas 6-1, 6-2, 6-3, 6-4, 6-5 of the respective radio networks is contained in datasets of a database of server 4 or a database server 4 has access to. The database may store a plurality of datasets with positioning data. The sets of positioning data may comprise geographical positions of the nodes, coverage area model information and/or radio channel model information. That is, the database may in particular comprise sets of positioning data associated with respective nodes 3-1, 3-2, 3-3, 3-4 and 3-5. Optionally, the database may further comprise the shortened identifiers of the obtained original identifiers associated with the nodes 3-1, 3-2, 3-3, 3-4 and 3-5.

Figure 2:
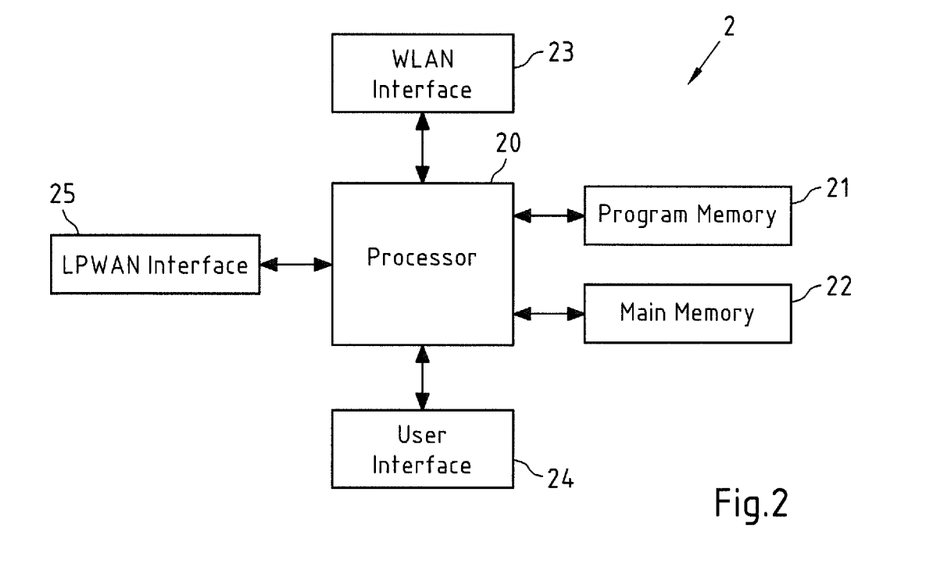
FIG. 2 is a block diagram of apparatuses 2 of FIG. 1 according to an exemplary embodiment of the invention.

FIG. 2 is a schematic block diagram of an example embodiment of a first apparatus 2 (e.g. low power device) according to the invention. The device may in particular be battery powered and/or powered by energy harvesting. Apparatus 2 may also form a part (e.g. as a module) of a low power device, for instance. A non-limiting example of such a low power device is a sensor device.

First apparatus 2 comprises a processor 20. Processor 20 may represent a single processor or two or more processors, which are for instance at least partially coupled, for instance via a bus. Processor 20 executes a program code stored in program memory 21 (for instance program code causing apparatus 2 to perform one or more of the embodiments of a first method according to the invention (as for instance further described below), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 20 may for instance comprise a first memory portion that is fixedly installed in apparatus 2, and a second memory portion that is removable from apparatus 2, for instance in the form of a removable SD memory card. One or more sets of position information, for instance in a database, that are useable by apparatus 2 to deter-mine positions may for instance be stored in program memory 21. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a WLAN interface 23 configured to at least receive and optionally to output information with respective first radio networks. For instance, WLAN interface 23 may be configured to at least identify nodes 3-1, 3-2, 3-3, 3-4 and 3-5 of system 1 of FIG. 1, that is to obtain respective original identifiers. As explained, WLAN interface 23 may also be a stripped down interface, which is basically only able to receive respective original identifiers, but in particular not capable of sending data. The WLAN interface 23 may for instance comprise circuitry such as modulators, filters, mixers, switches and/or one or more antennas to allow transmission and/or reception of signals. WLAN interface 23 may in particular be configured to allow communication according to a non-cellular WLAN radio network. However, the WLAN interface 23 may in other examples be any other suitable communication interface, depending on the technology used by the first radio network. In embodiments of the invention, WLAN interface 23 is may also be a communication interface configured to allow communication according to a 2G/3G/4G cellular radio network.

Processor 20 further controls a LPWAN interface 25 configured to receive and output information with a respective second radio network, in this case a LPWAN. In this way, the first apparatus 2 is able to at least send to and optionally receive information from the server 4 of system 1 (see FIG. 1). This may for instance comprise sending respective shortened (and optionally original) identifiers in the scope of positioning requests to server 4. Also, a position estimate may be received from server 4 via LPWAN interface 25. The communication with server 4 may for instance also be based on further connections, e.g. wired connections. That is, the communication route between first apparatus 2 and server 4 may equally well at least partially comprise wire-bound portions. For instance, server 4 may be connected to a back-bone of a wireless radio network (LPWAN) via an at least in part wire-bound system such as for instance the internet.

Processor 20 may further control an optional user interface 24 configured to present information to a user of first apparatus 20 and/or to receive information from such a user. Such information may for instance comprise information on a position estimate received. User interface 24 may for instance be the standard user interface via which a user of first apparatus 2 with first apparatus 2 to control other functionality thereof. However, it may also be possible that first apparatus does not have a user interface.

The components 21-25 of apparatus 2 may for instance be connected with processor 20 by means of one or more serial and/or parallel busses.

Figure 3:
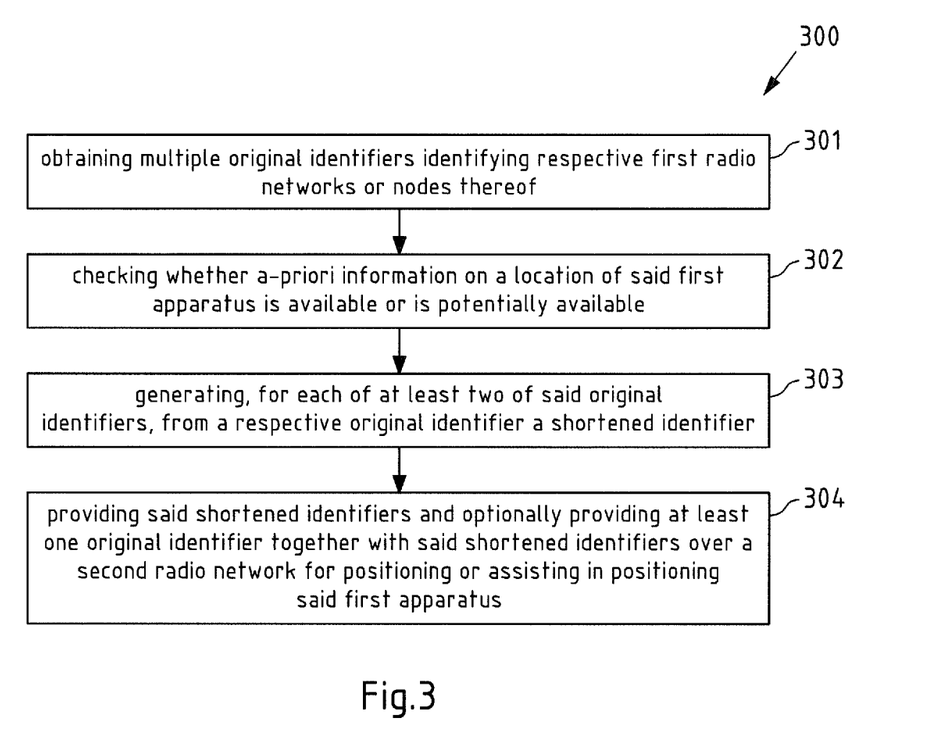
FIG. 3 is a flow chart illustrating a method according to an exemplary embodiment of the invention for instance performed by the apparatus 2 of FIGS. 1, 2.

An example embodiment of a method of the first aspect performed by the first apparatus 2 will be described with reference to FIG. 3 further below.

Figure 4:
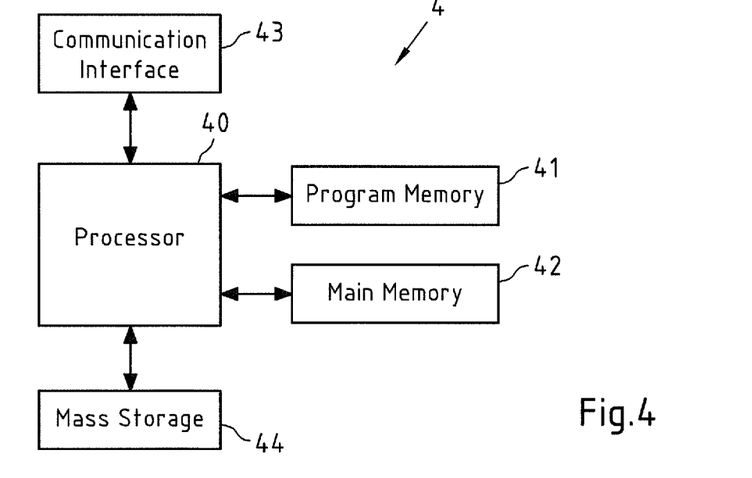
FIG. 4 is a block diagram of apparatus 4 of FIG. 1 according to an exemplary embodiment of the invention.

Turning now to FIG. 4, FIG. 4 is a schematic block diagram of an example embodiment of the second apparatus 4 according to the invention. Second apparatus 4 for instance is or forms a part (e.g. as a module) of a server, e.g. server 4 of FIG. 1.

Apparatus 4 comprises a processor 40. Processor 40 may represent a single processor or two or more processors, which are for instance at least partially coupled, for instance via a bus. Processor 40 executes a program code stored in program memory 41 (for instance program code causing apparatus 4 to perform embodiments of the second method according to the invention (as for instance described further below), when executed on processor 40). Processor 40 further interfaces with a main memory 42 (for instance acting as a working memory) and a mass storage 44, which may for instance store a plurality of original identifiers associated with respective first radio networks or nodes thereof and respective sets of positioning data and optionally respective shortened identifiers. Memories 41 and/or 42 may also be included into processor 40. Memories 41 and/or 42 may be fixedly connected to the apparatus 4 or may at least partially be removable from apparatus 4, for instance in the form of a memory card or stick. Program memory 41 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 41 may also comprise an operating system for processor 40. Program memory 40 may for instance be implemented as a hard disk. Main memory 42 may for instance be a volatile memory. It may for instance be a RAM or DRAM memory, to give but a few non-limiting examples. It may for instance be used as a working memory for processor 40 when executing an operating system and/or programs. Mass storage 44 may for instance be embodied as mass storage device, for instance with capacities of several Gigabytes or several Terabytes. It may either be fixedly connected to processor 40, or may be releasably connectable thereto. Non-limiting examples of mass storage 44 are a direct-attached storage (DAS), a storage area network (SAN) or a Network-attached storage (NAS).

Processor 40 further controls a communication interface 43 configured to receive and/or output information. For instance, communication interface 43 may be configured to exchange information with first apparatus 2 of system 1 (see FIG. 1). This may for instance comprise receiving requests (comprising shortened identifiers and optionally original identifiers) from first apparatus 2 and providing a position estimate to first apparatus 2. Even though the communication with first apparatus 2 is inter alia realized via the second radio network (LPWAN), the communication interface 43 may also be based on other technologies and only a part (e.g. the last part, "last mile") of the communication with first apparatus 2 is performed via said second radio network (LPWAN). The communication route from the server 4 to mobile terminal 2 may then for instance comprise both wire-bound and wireless portions. Thus, a wire-bound and/or wireless portion may for instance connect communication interface 43 with a back-bone of the second radio network (LPWAN) and thus with first apparatus 2. Communication interface 43 may for instance comprise circuitry such as modulators, filters, mixers, switches and/or one or more antennas to allow transmission and/or reception of signals.

The components 41-44 of apparatus 4 may for instance be connected with processor 40 by means of one or more serial and/or parallel busses.

It is to be noted that the circuitry formed by the components of apparatuses 2 and 4 may be implemented in hardware alone, partially in hardware and in software, or in software only, as further described at the end of this specification.

Example embodiments of the method of the first aspect and the second aspect will now be described with reference to the flow diagrams 300, 500 of FIGS. 3 and 5.

In the following MAC addresses are used as examples for the (original) identifiers. However, other identifiers may be used as well.

The first apparatus 2 (low power device) first observes and obtains the MAC addresses of nearby WLAN access points (e.g. nodes 3-1, 3-2, 3-3, 3-4 and 3-5 of FIG. 1), action 301.

The first apparatus 2 then checks whether a-priori information on a location of said first apparatus is already available, in order to determine whether only shortened identifiers shall be provided (a-priori information available) or whether also an original identifier shall be provided (a-priori information not available), action 302.

In the present case, it is assumed, that a-priori information is not available. Therefore, the first apparatus 2 will generate, in this case for four of said original identifiers a respective shortened identifier, action 303. For instance, while the original identifier of node 3-1 shall be provided as a full MAC address, a respective shortened identifier is generated for original identifiers of nodes 3-2, 3-3, 3-4 and 3-5.

There is the question of how to select from the original identifiers obtained the one that is to be provided in full and also the ones to be provided as shortened identifiers, particularly if there are more observed identifiers than are supposed to be included in the message. One approach is to use the one with the highest received signal strength (=highest RSSI value or Rx level) as the node or radio network for which the identifier shall be provided in full. Then the other nodes or radio networks are selected in descending order of received signal strength. Another possible approach is to select or prefer those nodes or radio networks, which share a commonality, e.g. a MAC addresses with identical OUI, that is with identical first 3 bytes.

Then, first apparatus 2 will create a 12-byte LPWAN message with one full original MAC address (of node 3-1) of 6 bytes and four shortened MAC addresses (of nodes 3-2, 3-3, 3-4 and 3-5). The four shortened identifiers may each take up 1.5 bytes, so that a message of 12 bytes in total is created. Depending on the number of shortened identifiers also six 1-byte shortened identifiers, three 2-byte shortened identifiers, two 3-byte shortened identifiers, or one 2-byte+ four 1-byte shortened identifiers, or any other suitable combination, may be used.

One approach to generate the shortened identifier is to pick e.g. the lowest n bytes of the original identifier, e.g. three bytes in a 3-byte version or 1.5 bytes in the 1.5-byte version mentioned above. Alternatively, it is also possible to hash the original identifier to create an as unique shortened identifier as possible.

To exemplify this feature, assume that the MAC addresses of the nodes are as follows:

```
Node 3-1:
AABBCCDDEEFF

Node 3-2:
AABBCCDDEABC

Node 3-3:
AABBCCDDEDEF

Node 3-4:
AABBCCDDEBFA

Node 3-5:
AABBCCDDECAD
```

The first apparatus will then truncate the MAC addresses of node 3-2 to 3-5 and create a message or positioning request containing the following identifiers (one full MAC address and four 1.5-byte shortened MAC addresses):

AABBCCDDEEFF ("full original identifier of node 3-1")
ABC ("shortened identifier of node 3-2")
DEF ("shortened identifier of node 3-3")
BFA ("shortened identifier of node 3-4")
CAD ("shortened identifier of node 3-5")

The 12-byte message with the shortened identifiers together with the one original identifier will be sent over the second radio network (LPWAN) to the server 4 for positioning or assisting in positioning said first apparatus 2, action 304.

Figure 5:
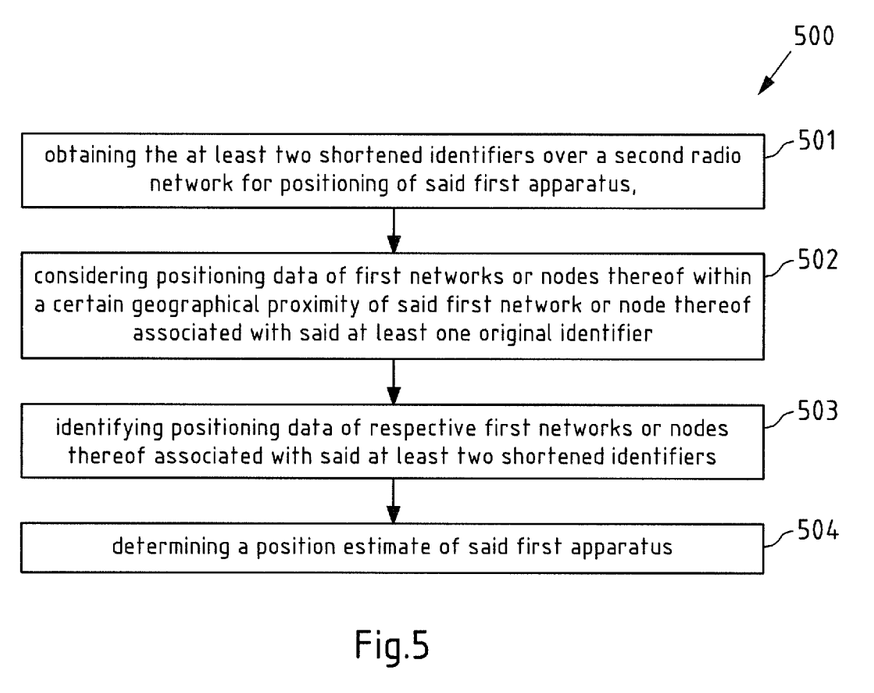
FIG. 5 is a flow chart illustrating a method according to an exemplary embodiment of the invention for instance performed by apparatus 4 of FIGS. 1, 4.

Turning now to FIG. 5, the second apparatus 4 (server) will receive the message with the original and shortened identifiers, action 501.

Now the server 4 retrieves (e.g. from a positioning database) positioning data for the first radio network or node 3-1 for which the original identifier is available (and which positioning data can be determined unambiguously). Server 4 also retrieves positioning data and the original identifiers for all first networks or nodes thereof within a certain geographical proximity of said first network or node thereof associated with said at least one original identifier, action 502.

For instance, this may result in obtaining positioning data and the following respective MAC addresses at server 4, as these are first radio networks or nodes thereof in proximity (e.g. within 100 meters or so) of node 3-1, for which the full MAC address (AABBCCDDEEFF) is known at server 4:

```
AABBCCDDEABC

AABBCCDDEEFE

AABBCCDDEDEF

AABBCCDDEBFA

AABBCCDEEBFA
```

Now, server 4 can (try to) identify positioning data of respective first networks or nodes thereof associated with said at least two shortened identifiers, action 503, which will lead to the following result:

```
AABBCCDDEABC → matches to shortened identifier of
node 3-2

AABBCCDDEEFE → does not math any shortened
identifier

AABBCCDDEDEF → matches to shortened identifier of
node 3-3

AABBCCDDEBFA → matches to shortened identifier of
node 3-4

AABBCCDEEBFA → also matches to shortened
identifier of node 3-4
```

Now, as can be noticed, unique matches were found for the nodes 3-2 and 3-3. However, for the node 3-4 there was a non-unique match. One option is not to use the identifiers AABBCCDDEBFA and AABBCCDEEBFA identified with shortened identifier BFA and the respective positioning data for positioning. However, another option would be to use the positioning data for both MAC addresses AABBCCD-DEBFA and AABBCCDEEBFA for positioning. Finally, there was no match for the shortened identifier of node 3-5. Therefore, the positioning data of in total three nodes (node 3-1, node 3-2 and node 3-3) can be used for positioning. Using the positioning data a positioning estimate of said first apparatus 2 can be determined, action 504.

In other words, since server 4 has obtained one MAC address in its full, unique form, the respective database can be queried for the respective positioning data of the first network or node thereof. Then, the MAC addresses of geographically nearby first networks or nodes thereof can be compared to the shortened MAC addresses received in the positioning request. This makes it possible in the described example case to use more than two nodes in positioning. In this scheme the database is searchable not only by MAC addresses, but also by location so that positioning data for geographically nearby first networks or nodes thereof can be retrieved, too.

However, if there is prior information on the position of the first apparatus 2, no full MAC address is needed, not even of node 3-1. In that case, the 12-byte message could be used to carry e.g. six 2-byte shortened MAC addresses. Such prior information might result, for instance, from an earlier positioning determination and/or the knowledge that the first apparatus has not moved substantially.

Figure 6:
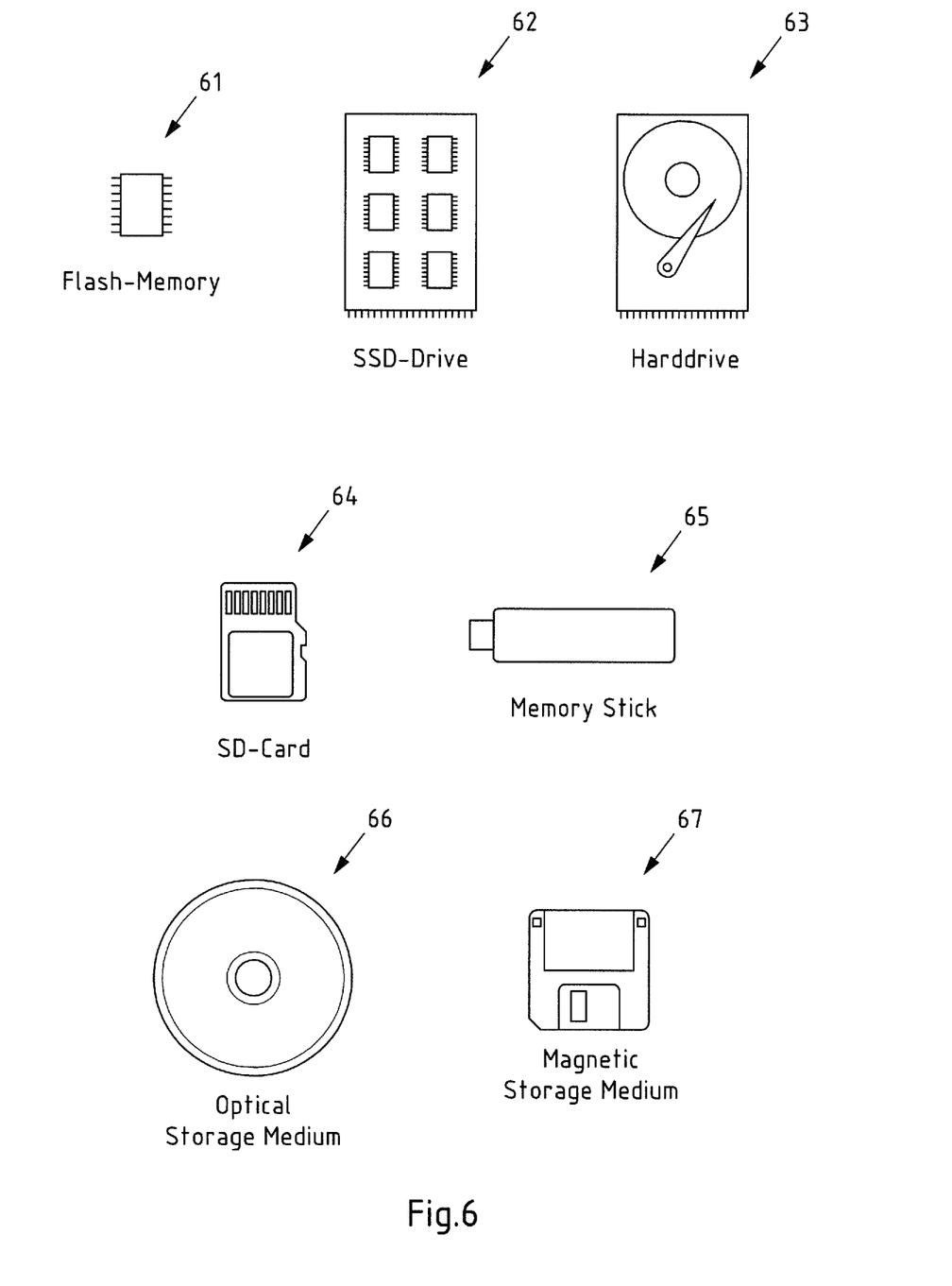
FIG. 6 is a schematic illustration of examples of tangible storage media according to the present invention.

FIG. 6 illustrates examples of tangible storage media that may for instance be used to implement program memory 21 of FIG. 2 and/or program memory 41 of FIG. 4. To this end, FIG. 6 displays a flash memory 61, which may for instance be soldered or bonded to a printed circuit board, a solid-state drive 62 comprising a plurality of memory chips (e.g. Flash memory chips), a magnetic hard drive 63, a Secure Digital (SD) card 64, a Universal Serial Bus (USB) memory stick 65, an optical storage medium 66 (such as for instance a CD-ROM or DVD) and a magnetic storage medium 67.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/ software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 20 and 40 of FIGS. 2 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. Method, performed by a first apparatus, for positioning or assisting in positioning said first apparatus, said method comprising:
    obtaining multiple original identifiers identifying respective first radio networks or nodes thereof;
    generating, for each of at least two of said original identifiers, from a respective original identifier a shortened identifier being representative of said respective original identifier and having a smaller size than said respective original identifier;
    checking whether a-priori information on a location of said first apparatus is available or is potentially available,
    providing said shortened identifiers over a second radio network for positioning or assisting in positioning said first apparatus;
    providing at least one original identifier together with said shortened identifiers, when a result of said checking is that a-priori information on a location of said first apparatus is not available or potentially not available; and
    providing said shortened identifiers without providing an original identifier, when a result of said checking is that a-priori information on a location of said first apparatus is available or is potentially available.

2. Method according to claim 1, wherein said method is performed more than once and wherein, for at least some provisions of the at least one original identifier, a different original identifier is chosen from the obtained multiple original identifiers.

3. Method according to claim 1, wherein said at least two original identifiers for which a shortened identifier is generated and provided and/or said at least one original identifier to be provided with said shortened identifiers are/is selected from said multiple original identifiers at least in part based on a quality parameter of signals of respective first radio networks or nodes thereof.

4. Method according to claim 1, wherein said at least two original identifiers for which a shortened identifier is generated and provided and/or said at least one original identifier to be provided with said shortened identifiers are/is selected from said multiple original identifiers at least in part based on a commonality of said original identifiers.

5. Method according to claim 4, wherein said commonality of said original identifiers is an identical section of one or more information units of respective original identifiers.

6. Method according to claim 1, wherein said generating of a respective shortened identifier is at least based on truncating a respective original identifier.

7. Method according to claim 1, wherein said generating of a respective shortened identifier is at least based on utilizing one or more information units of a respective original identifier.

8. Method according to claim 1, wherein said generating of a respective shortened identifier is at least based on hashing a respective original identifier or a part thereof.

9. Method according to claim 1, wherein a data rate of at said first apparatus for providing said shortened identifiers and/or said at least one original identifier is 50 kbit/s or less.

10. Method according to claim 1, wherein a payload of a message and/or a packet of said first apparatus for providing said shortened identifiers and/or said at least one original identifier is at most 100 bytes.

11. Method according to claim 1, wherein said shortened identifiers and/or said at least one original identifier are provided in a payload of a single message and/or a single packet.

12. Method for positioning or assisting in positioning a first apparatus, performed by a second apparatus, said method comprising:
    obtaining at least two shortened identifiers over a second radio network for positioning of said first apparatus, each of said shortened identifiers having been generated from a respective original identifier obtained at said first apparatus and identifying respective first radio networks or nodes thereof, wherein a respective shortened identifier is representative of a respective original identifier and having a smaller size than said respective original identifier;
    determining positioning data of respective first networks or nodes thereof based at least in part on said at least two shortened identifiers and, when available, a priori information on a location of the first apparatus or, when the a priori information on the location of the first apparatus is not available, an original identifier obtained at said first apparatus; and
    determining a position estimate of said first apparatus at least in part based on the positioning data of the respective first networks or nodes thereof associated with said at least two shortened identifiers, wherein, if available, said determining of a position estimate of said first apparatus is at least in part also based on a-priori knowledge on a position of said first apparatus.

13. Method according to claim 12, said method further comprising:
    obtaining at least one original identifier obtained at said first apparatus together with said shortened identifiers;
    wherein said determining of a position estimate of said first apparatus is at least in part also based on positioning data of respective first networks or nodes thereof associated with said at least one original identifier.

14. Method according to claim 13, wherein positioning data of respective first networks or nodes thereof associated with said at least two shortened identifiers is identified by only considering positioning data of first networks or nodes thereof within a certain geographical proximity of said first network or node thereof associated with said at least one original identifier.

15. Method according to claim 12, wherein in case it is determined that an obtained shortened identifier is associated with positioning data of different first networks or nodes thereof, the positioning data of none, all or a preferred one of said different first networks or nodes thereof is used for said determining of a position estimate.

16. Method according to claim 12, wherein said shortened identifiers obtained at the second apparatus are in each case based on a respective truncated original identifier.

17. Method according to claim 12, wherein said shortened identifiers obtained at the second apparatus are in each case at least based on one or more information units of a respective original identifier.

18. Method according to claim 12, wherein said shortened identifiers obtained at the second apparatus are in each case at least based on a hash value of a respective original identifier or a part thereof.

19. An apparatus comprising at least one processor and at least one memory including computer program code, the at least one memory and the computer program code configured to, with the at least one processor, cause an apparatus at least to:

obtain multiple original identifiers identifying respective first radio networks or nodes thereof;

generate, for each of at least two of said original identifiers, from a respective original identifier a shortened identifier being representative of said respective original identifier and having a smaller size than said respective original identifier;

check whether a-priori information on a location of said first apparatus is available or is potentially available, provide said shortened identifiers over a second radio network for positioning or assisting in positioning said first apparatus;

provide at least one original identifier together with said shortened identifiers, when a result of said checking is that a-priori information on a location of said first apparatus is not available or potentially not available; and providing said shortened identifiers without providing an original identifier, when a result of said checking is that a-priori information on a location of said first apparatus is available or is potentially available.

* * * * *